United States Patent
Krauss

(10) Patent No.: US 10,409,708 B2
(45) Date of Patent: *Sep. 10, 2019

(54) PERFORMANCE DATA COLLECTION FOR A DISTRIBUTED COMPUTING SYSTEM

(71) Applicant: INTERNATIONAL BUSINESS MACHINES CORPORATION, Armonk, NY (US)

(72) Inventor: Kirk J. Krauss, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/687,880

(22) Filed: Aug. 28, 2017

(65) Prior Publication Data
US 2019/0065346 A1    Feb. 28, 2019

(51) Int. Cl.
| G06F 9/44 | (2018.01) |
| G06F 11/36 | (2006.01) |
| G06F 9/54 | (2006.01) |
| G06F 11/30 | (2006.01) |
| G06F 11/34 | (2006.01) |
| G06F 16/22 | (2019.01) |

(52) U.S. Cl.
CPC .......... *G06F 11/3612* (2013.01); *G06F 9/547* (2013.01); *G06F 11/3006* (2013.01); *G06F 11/3409* (2013.01); *G06F 16/2237* (2019.01)

(58) Field of Classification Search
CPC .. G06F 16/2237; G06F 11/3612; G06F 9/547; G06F 11/3006; G06F 11/3409
See application file for complete search history.

(56) References Cited

U.S. PATENT DOCUMENTS

| 5,802,378 A | 9/1998 | Arndt et al. |
| 5,896,538 A | 4/1999 | Blandy et al. |
| 7,827,541 B2 | 11/2010 | Chen et al. |
| 8,347,273 B2 * | 1/2013 | Nageshappa ....... G06F 11/3636 717/127 |
| 8,418,149 B2 | 4/2013 | Krauss |

(Continued)

OTHER PUBLICATIONS

Matthew Arnold and David Grove, Collecting and Exploiting High-Accuracy Call Graph Profiles in Virtual Machines, IEEE, 2005, retrieved online on Apr. 26, 2019, pp. 1-12. Retrieved from the Internet: <URL: http://delivery.acm.org/10.1145/1050000/1048975/22980051.pdf?>. (Year: 2005).*

(Continued)

*Primary Examiner* — Hanh Thi-Minh Bui
(74) *Attorney, Agent, or Firm* — Griffiths & Seaton PLLC

(57) ABSTRACT

Embodiments for profiling an instance of a computing program distributed across a plurality of nodes in a distributed computing environment. First call data, comprising one or more parameters passed to a first function executing on a first node, may be collected within an instance of a computing application. Second call data, comprising one or more parameters passed to a second function executing on a second node, may be collected within an instance of a computing application. The first call data and the second call data may be compared such that the comparison is provided via one or more call graphs representing the instance.

17 Claims, 11 Drawing Sheets

(56) References Cited

U.S. PATENT DOCUMENTS

| | | | |
|---|---|---|---|
| 8,869,163 B2 | 10/2014 | Toukmaji et al. | |
| 2008/0178161 A1* | 7/2008 | Cates | G06F 11/3612 717/133 |
| 2011/0138368 A1* | 6/2011 | Krauss | G06F 11/3466 717/133 |
| 2018/0253350 A1* | 9/2018 | Xia | G06F 11/3006 |

OTHER PUBLICATIONS

Shobaki et al., "A Hardware and Software Monitor for High-Level System-on-Chip Verification," Quality Electronic Design 2001 International Symposium, Retrieved from the Internet: http://www.es.mdh.se/pdf_publications/221.pdf, Aug. 7, 2002 (6 pages).

Knoll, "A Machine Learning Perspective on Predictive Coding with PAQ8 and New Applications," Doctoral dissertation, Retrieved from https://www.cs.ubc.ca/projects/knoll/thesis.pdf, 2011 (55 pages).

Bertels et al., "Advanced Profiling of Applications for Heterogeneous Multi-Core Platforms," Proceedings of the 2011 International Conference on Engineering of Reconfigurable Systems & Algorithms (ERSA 2011), CSREA Press, 2011 (13 pages).

Yang, "A Structured and Automatic Approach to the Performance Measurement of Parallel and Distributed Programs," An IP.com Prior Art Database Technical Disclosure, IP.com No. IPCOM000161126D, Dec. 31, 1987 (81 pages).

\* cited by examiner

ENTRY POINT RECOGNITION

DEPTH-FIRST SEARCH, FROM EACH
ENTRY POINT, FINDS MATCHING
ROUTINES BY THEIR SYMBOLIC NAMES

PERFORMANCE DATA COLLECTION FOR A DISTRIBUTED COMPUTING SYSTEM

BACKGROUND OF THE INVENTION

Field of the Invention

The present invention relates in general to computing systems, and more particularly to various embodiments for profiling an instance of a computing program distributed across a plurality of nodes in a distributed computing environment.

Description of the Related Art

Over recent decades, computers and computer-driven equipment have become commonplace. Processing devices, with the advent and miniaturization of integrated circuits, have become integrated into a wide variety of personal, business, health, home, education, scientific, and other devices. Accordingly, the use of computers, network appliances, and similar data processing devices continues to propagate throughout society. In some contexts, such as research involving the physical, geological, and meteorological sciences, the concurrent use of multiple processing devices to perform a related set of tasks is becoming increasingly commonplace.

As the use of concurrency and task parallelism in the technology field grows, the need for advancement in the techniques for efficiently and consistently improving computing performance, processing, and efficiency is paramount. Consequently, the need for advancement in data processing, storage, and computing application performance relevant to concurrent tasks and parallel systems is becoming crucial to the success of software development efforts involving those systems.

SUMMARY OF THE INVENTION

Various embodiments for profiling an instance of a computing program distributed across a plurality of nodes in a distributed computing environment, by a processor, are provided. In one embodiment, by way of example only, a method for profiling an instance of a computing program distributed across a plurality of nodes in a distributed computing environment, again by a processor, is provided. First call data, comprising one or more parameters passed to a first function executing on a first node, may be collected within an instance of a computing application. Second call data, comprising one or more parameters passed to a second function executing on a second node, may be collected within an instance of a computing application. The first call data and the second call data may be compared such that the comparison is provided via one or more call graphs representing the instance.

BRIEF DESCRIPTION OF THE DRAWINGS

In order that the advantages of the invention will be readily understood, a more particular description of the invention briefly described above will be rendered by reference to specific embodiments that are illustrated in the appended drawings. These drawings depict only typical embodiments of the invention and are not therefore to be considered to be limiting of its scope. The invention will be described and explained with additional specificity and detail through the use of the accompanying drawings, in which.

DETAILED DESCRIPTION OF THE INVENTION AND DRAWINGS

Figure 1:
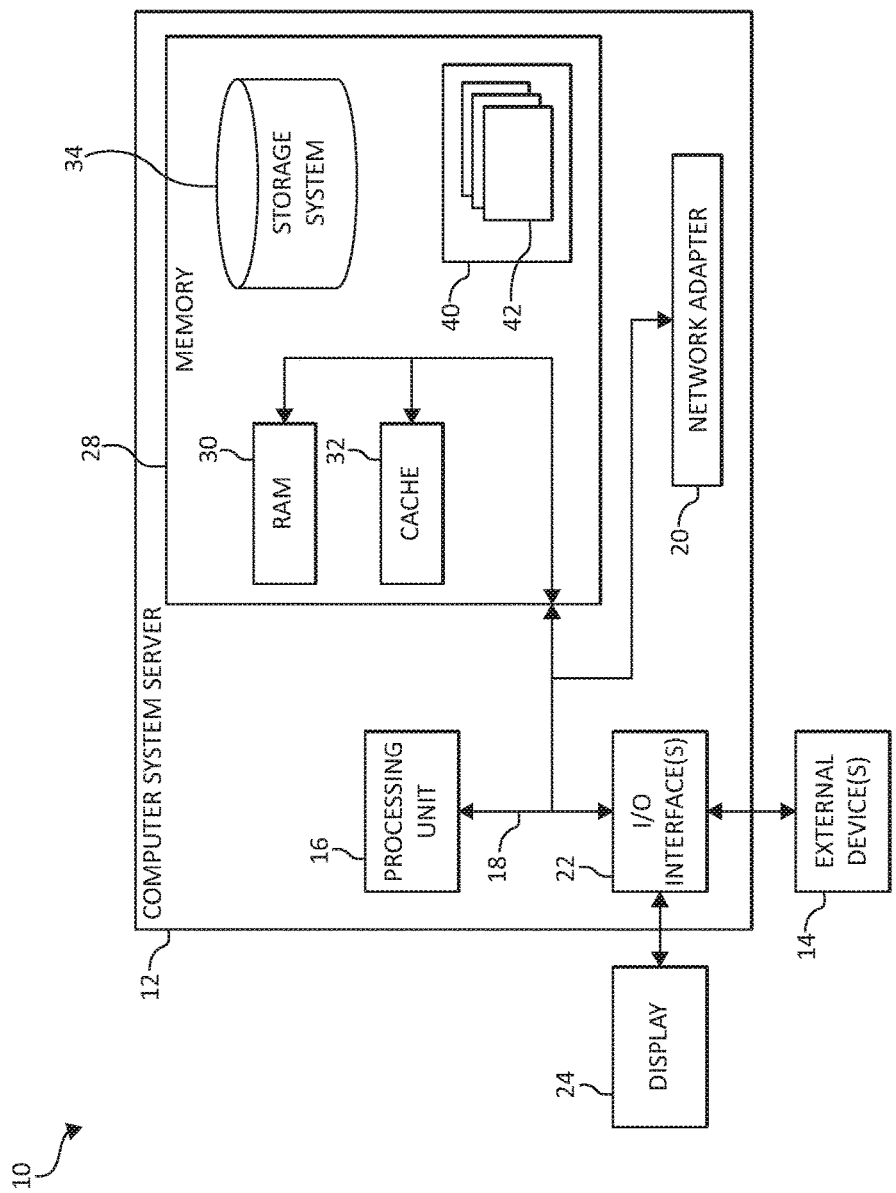
FIG. 1 is a block diagram depicting an exemplary cloud computing node according to an embodiment of the present invention.

A challenge faced by software developers is figuring out why their application program behaves inconsistently depending on how and where it runs. Various maladies may plague a software application, either during development or in the field. In order to address these issues, the software developer may reproduce an unexpected scenario while using a debugger. Collecting the data needed for debugging parallel and distributed systems is very challenging. It is well known that some errors manifest themselves only after a distributed sequence of events and that finding these errors normally calls for a tool that produces the sequence of state changes that led to the problem. An omniscient debugger (a debugger that records a history of instruction sequences during a run of a computer program) may be used in distributed computing systems. However, the overhead of recording sufficient history, in such a debugger, to capture the entire relevant sequence of state changes that led to the problem can require more resources than are available to the distributed system. Debugging these systems otherwise involves tacking a distributed front end onto an ordinary single-system debugger that is not oriented toward automation for ferreting out related sets of events involving multiple nodes. A non-debugger approach also may be used (e.g. logs, traces, and statistics gathering). Like the single-system debugger, the non-debugger approach also is not oriented toward automation for ferreting out related sets of events involving multiple nodes.

A profiling tool may be used in a distributed computing system context. In one aspect, a profiling tool may gather performance data from each process, and merge the information to present why and where a message passing interface (MPI) or any code executed in a multiprocessing context is slow. Graphics used in the profiling tool may include indicators of quantities or identifiers of cores used by a particular code sequence.

However, a conventional profiling tool has certain limitations that limit its utility in the distributed context. These limitations include: 1) Call graph views offered by conventional profiling tools do not show which functions have executed on which node and are rarely seen in distributed profilers at all, 2) Functions that access memory shared across nodes are not differentiated from other functions, 3) Results across nodes are rolled up together, rather than compared with one another; and 4) A user/operator is unable to get the conventional profiler to compare results across nodes, even for functions of interest to the user.

These limitations of conventional profiling tools may lead to computing inefficiency when these tools fail to draw attention to significant performance bottlenecks, given that in distributed systems only certain sequences of events involving multiple computing nodes tend to give rise to certain unexpected outcomes that require programmer attention. Omniscient debuggers, which might track those sequences of events, require a great deal of operating overhead because programs generate enormous amounts of transient data, and recording all of the transient data can be expensive. This is true even for omniscient debuggers that seek scalability by losing valuable information during a run.

Accordingly, a need exists for a profiler that addresses the above limitations for diagnosing problems in distributed applications. Also, a need exists for the collection of function-level and line-level call graph data in which results for a single computing instance can be compared node-to-node, and in a manner that scales for large and long-running distributed applications.

In one aspect, the present invention provides for a profiler operation (e.g., a runtime analysis tool feature) that may perform a differential comparison of process flow involving a computing task instance being executed on multiple nodes. The profiler operation may compare function-level and line-level profiling data involving the processes of a single computing task instance of a distributed application in a profiling context. The present invention provides for automatic selection of a portion of a run for comparison. The automatic selection may be based on user input regarding the selected portion, or based entirely on automatic determination. In addition, the present invention provides for keeping the data relevant for comparing selected portions of a computing task instance while discarding other redundant aspects that accumulate across nodes.

In an additional aspect, the present invention provides for profiling an instance of a computer program distributed across a plurality of nodes in a distributed computing environment, by a processor. First call data, comprising one or more parameters passed to a first function executing on a first node, may be collected within an instance of a computing application. Second call data, comprising one or more parameters passed to a second function executing on a second node, may be collected within an instance of a computing application. The first call data and the second call data may be compared such that the comparison is provided via one or more call graphs representing the instance.

It should be noted that as used herein, a data structure used to track the function parameters associated with a particular call to a function, during execution of a computer program under test, may be called a parameters data structure. A data structure used to track a sequence of function calls, during execution of a computer program under test, may be called a stack frame data structure. A set of these data structures can be interlinked to represent the execution flow of the computer program under test as a directed graph. In some aspects such a directed graph is commonly known as a call graph or call tree, but the present invention extends the call graph concept to encompass an execution trace that includes a portion of control flow history for a portion of the call graph, for use in differential comparison.

Space may be allocated for tracking the parameters for a function at runtime, when the function is called. One or more of these data structures may be associated with the stack frame data structure that is in turn associated with a particular function tracked in a call graph that references a portion of execution history for the function.

A basic block may be a set of instructions, within a function, that run as a deterministic sequence. Once a basic block is entered, every instruction in the basic block may execute, unless an exception or program termination condition occurs. A data structure used to track the order of execution of the basic blocks within a function, during a particular call to that function, may be called a basic block set descriptor data structure. Space may be allocated for tracking a basic block set descriptor for a function at runtime, when the function is called. One or more of these data structures may be associated with the stack frame data structure that is in turn associated with a particular function tracked in a call graph that references a portion of execution history for the function.

It is understood in advance that although this disclosure includes a detailed discussion of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk" or Universal Serial Bus (USB) "thumb drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
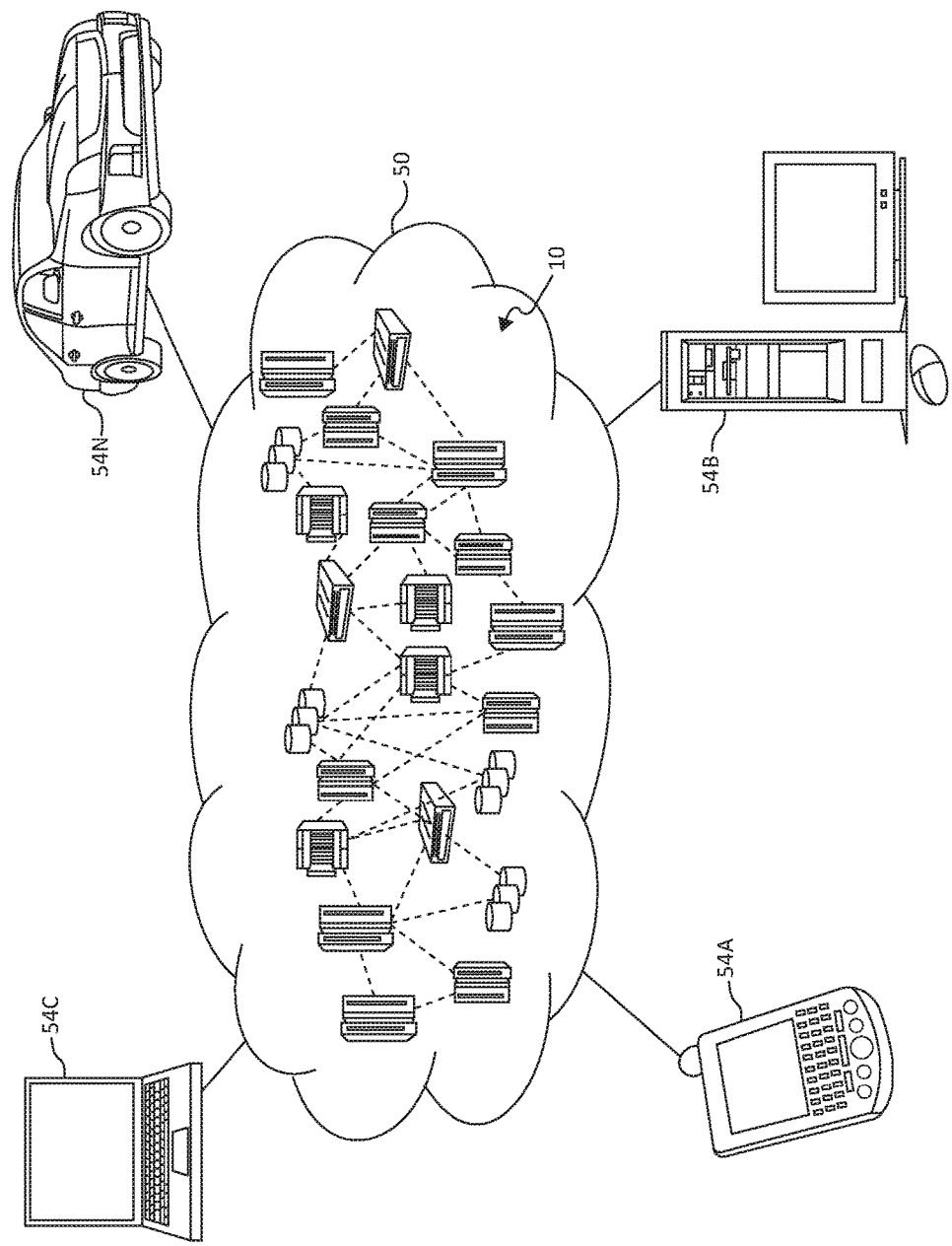
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
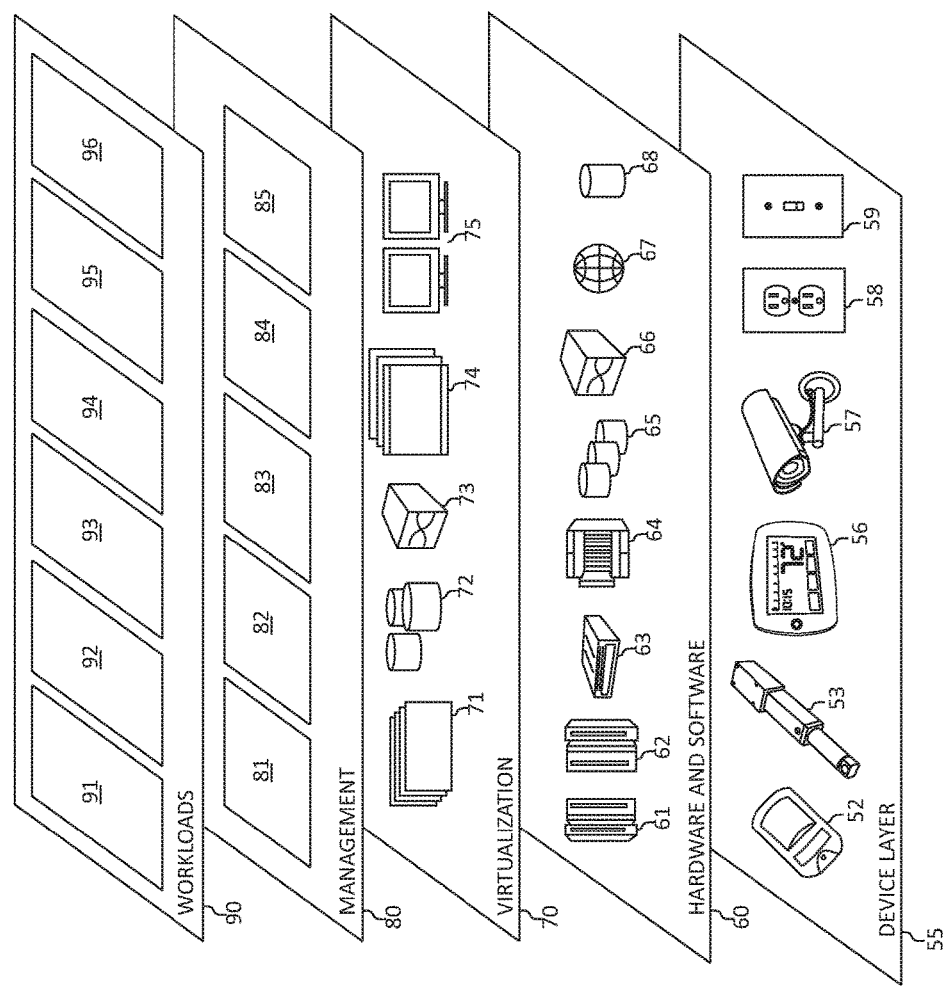
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various runtime analysis tool workloads and functions 96. In addition, runtime analysis tool workloads and functions 96 may include such operations automated data exploration and validation, and as will be further described, user and device management functions. One of ordinary skill in the art will appreciate that the runtime analysis tool workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
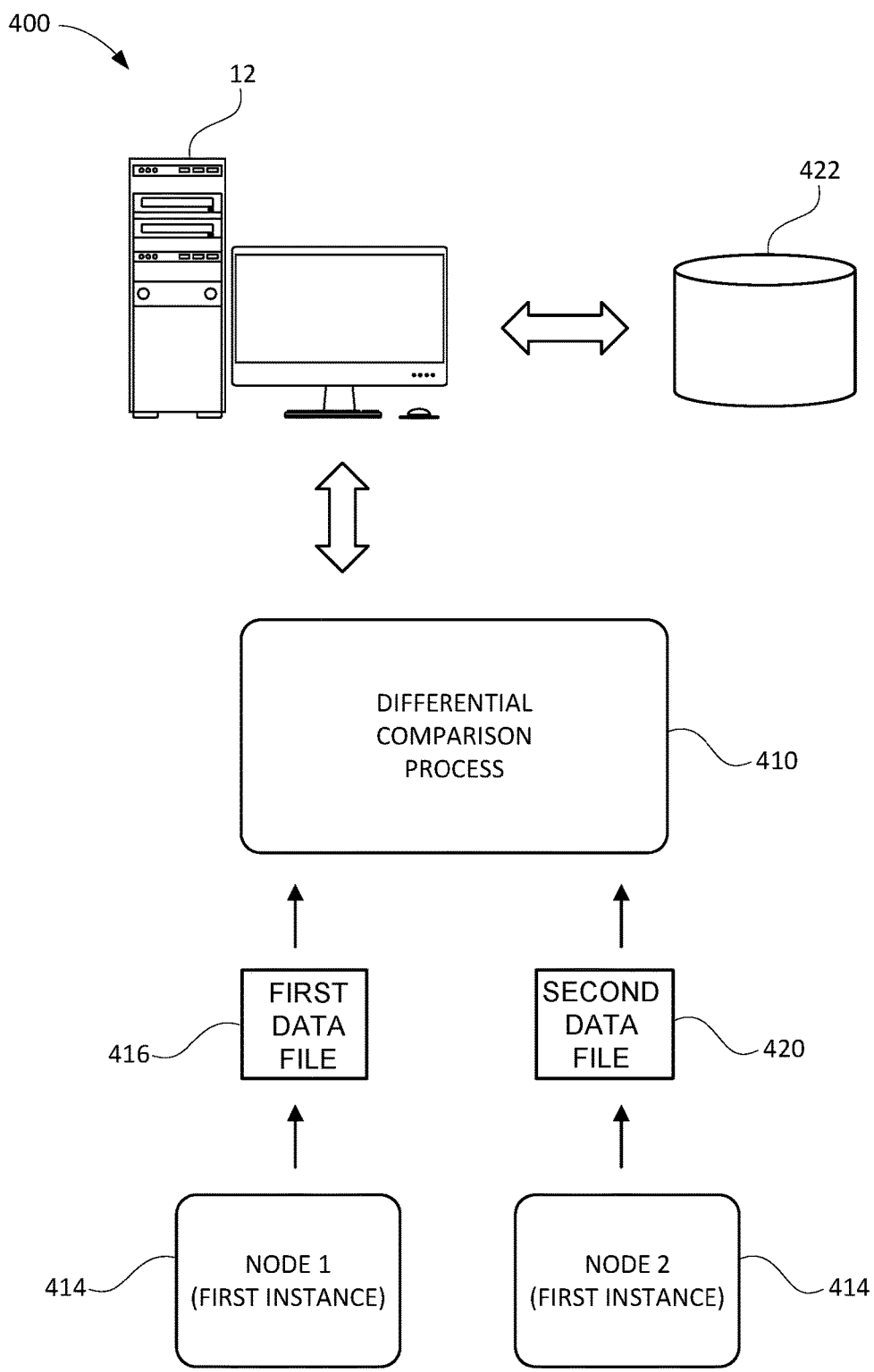
FIG. 4 is a diagram depicting an exemplary differential comparison process executed by a processor in which aspects of the present invention may be realized.

Turning now to FIG. 4, a block diagram of exemplary functionality 400 relating to a runtime analysis tool for differential comparison of an instance of a computer program executing on different nodes is depicted. As shown, the various blocks of functionality are depicted with arrows designating the blocks' 400 relationships with each other and to show process flow. Additionally, descriptive information is also shown relating to each of the functional blocks 400. As will be seen, many of the functional blocks may be considered "modules" of functionality, in the same descriptive sense as has been previously described in FIGS. 1-3. With the foregoing in mind, the module blocks 400 may be incorporated into various hardware and software components of a system for performance data collection in accordance with the present invention, such as collection of performance data related to those hardware and software components described in FIGS. 1-3. Many of the functional blocks 400 may execute as background processes on various devices, either in distributed computing devices, or on a single (e.g. user controlled) device, or elsewhere.

Referring to FIG. 4, a diagram 400 is shown depicting a differential comparison process 410 resident on (in whole or in part) and executed by (in whole or in part) analysis computer 12 (e.g., a single server computer (see FIG. 1), a plurality of server computers, or a general-purpose computer, for example). The differential comparison process 410 may monitor the chronological order in which one or more portions (e.g., one or more lines of code, functions, and basic blocks) of an instance 414 of a computer program (e.g., a computer program under test "CPUT") on a first node ("node 1") are executed, thus generating first data file 416. The chronological order in which one or more portions (e.g., one or more lines of code, functions, and basic blocks) of the computer program instance 414 of the computer program on a second node ("node 2") are executed and may be monitored, thus generating second data file 420. First and second data files 416 and 420 may be compared to identify differences generated from the computing instance 414 of a computer application on the first node ("node 1") and the second node ("node 2").

First and second data files 416 and 420 may take the form of data sets backed by computer-readable media, or they may take the form of strictly memory-resident data sets. First and second data files 416 and 420 may reside in the memory of, or may be stored on the computer-readable media of storage device 422 coupled to, one or more of the various nodes of a distributed system (e.g. "node 1" and "node 2" and analysis computer 12). Differential comparison process 410 of first and second data files 416 and 420 may be performed by software executed (in whole or in part) on analysis computer 12. The software that performs the differential comparison process 410 may be a component of a profiling tool that incorporates an embodiment of the present invention.

The instruction sets and subroutines of differential comparison process 410 may be stored on a storage device 422 coupled to analysis computer 12 and may be executed by one or more processors (not shown) and one or more memory architectures (not shown) incorporated into analysis computer 12. Storage device 422 may include, but is not limited to, a hard disk drive, a tape drive, an optical drive, a RAID array, a random access memory (RAM), or a read-only memory (ROM).

Figure 5:
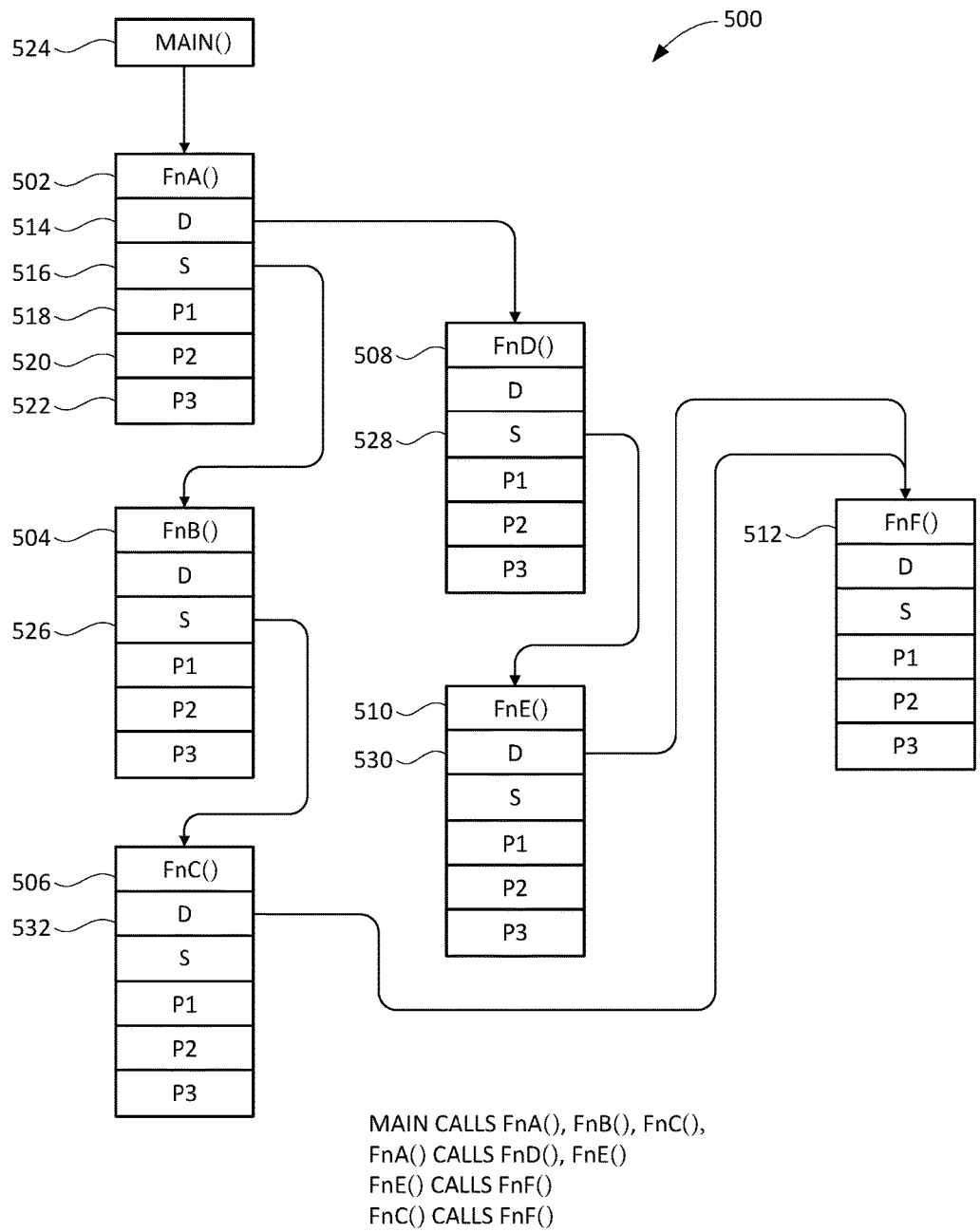
FIG. 5 is a diagram depicting an exemplary view of a call graph in which aspects of the present invention may be realized.

Referring to FIG. 5, there is shown a call graph 500 that provides an illustrative example of the manner in which functions may be called during the first instance 414 of the computer program running on at least two different nodes (e.g., node 1 and node 2 of FIG. 4). Call graph 500 is shown to include a plurality of stack frames 502, 504, 506, 508, 510, 512, each of which is shown to include a plurality of pointers representing the interconnections among the data structures comprising call graph 500. For example, stack frame 502 is shown to include five pointers, namely descendant pointer 514, sibling pointer 516, previously-called function pointer 518, basic block set descriptor pointer 520, and parameters data structure pointer 522.

Descendant pointer 514 may define a function called by the function in question (e.g., "FnA( )" illustrated as stack frame 502). Sibling pointer 516 may define a function called simultaneously with the function in question. Previously-called function pointer 518 may define the function that was called just prior to the function in question, thus allowing for establishment of an "order-in-time" that defines a sequence of function calls. Basic block set descriptor pointer 520 may define a basic block set descriptor for the function in question, and parameters data structure pointer 522 may define one or more parameters (e.g., arguments and variables) for the function in question.

Assume for illustrative purposes that "Main( )" 524 calls Function A (illustrated as stack frame 502), Function B (illustrated as stack frame 504), and Function C (illustrated as stack frame 506); Function A (illustrated as stack frame 502) calls Function D (illustrated as stack frame 508) and Function E (illustrated as stack frame 510); Function E (illustrated as stack frame 510) calls Function F (illustrated as stack frame 512); and Function C (illustrated as stack frame 506) calls Function F (illustrated as stack frame 512).

For the calls from "Main( )" 524 to Function A ("FnA( )"), Function B ("FnB( )") and Function C ("FnC( )"): "Main( )" is shown to point to stack frame 502 (i.e., the stack frame for Function A); sibling pointer 516 of stack frame 502 is shown to point to stack frame 504 (i.e., the stack frame for Function B); and sibling pointer 526 of stack frame 504 is shown to point to stack frame 506 (i.e., the stack frame for Function C).

For the calls from Function A to Function D ("FnD( )") and Function E ("FnE( )"): descendant pointer 514 of stack frame 502 (i.e., the stack frame for Function A) is shown to point to stack frame 508 (i.e., the stack frame for Function D); and sibling pointer 528 of stack frame 508 is shown to point to stack frame 510 (i.e., the stack frame for Function E).

For the call from Function E to Function F: descendant pointer 530 of stack frame 510 (i.e., the stack frame for Function E) is shown to point to stack frame 512 (i.e., the stack frame for Function F).

For the call from Function C to Function F: descendant pointer 532 of stack frame 506 (i.e., the stack frame for Function C) is shown to point to stack frame 512 (i.e., the stack frame for Function F).

Figure 6:
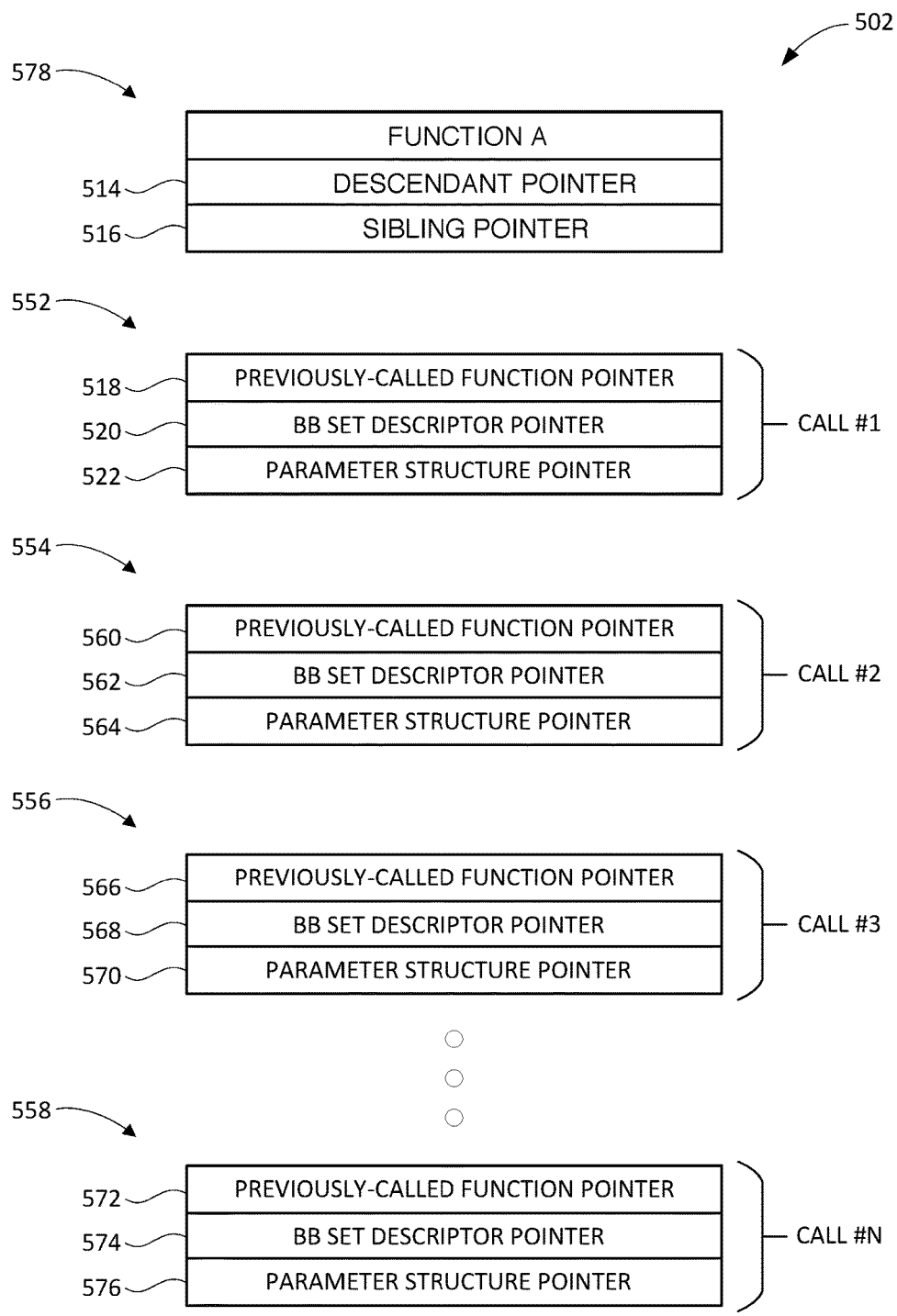
FIG. 6 is a diagram depicting an exemplary view of a stack frame data structure in which aspects of the present invention may be realized.

Referring to FIG. 6, the data included in several of the structures associated with a stack frame (e.g., stack frames 502, 504, 506, 508, 510, 512 of FIG. 5) may vary when the function in question is called multiple times such as, for example, during the execution of first instance 414 on multiple nodes (e.g., node 1 and node 2 of FIG. 4). Specifically, previously-called function pointer 518, basic block set descriptor pointer 520, and parameters structure pointer 522 may vary (from call to call) when the function in question is called multiple times. However, the descendant and sibling functions may remain constant during multiple calls into the function in question, and thus descendant pointer 514 and sibling pointer 516 may remain identical for the multiple calls.

Accordingly, for the efficacy of storage of call graph data, previously-called function pointer 518, basic block set descriptor pointer 520, and parameters structure pointer 522 may be grouped together and referred to as a call structure, which may be unique for each call into the function in question. Further, descendant pointer 514 and sibling pointer 516 may be grouped together and referred to as a stack frame structure, which is typically the same for all calls of one function into another. If a function is called multiple times, then a list of call structures can be associated with the stack frame structure that corresponds to that function. The list can be ordered by the order-in-time in which each call occurred.

A complete sequence of function calls can be generated, in the order in which they have occurred during actual execution, by following the list of previously-called function pointers back to its beginning and building up a list of calls in the reverse of that order. This list may thread through the call structures associated with various stack frames. If memory becomes constrained because of the accumulation of call structures in this time-dependent ordering, the oldest call structures can be identified (by walking to the beginning of the list) and purged. Though this may cause data loss in such a way as to effectively move the recorded start point forward in time, the overall data set size required for storage of the call and stack frame structures is much smaller than the data set size required for equivalent execution history data usable by typical omniscient debuggers (which record each executed basic block in step-by-step fashion). Unlike an omniscient debugger, a profiler that embodies the invention may record a single call structure together with a count, in order to represent a prospectively large number of calls in which functional execution order is identical, advantageously allowing embodiments of the present invention to achieve a relatively long-term accumulation of relevant recorded history of a run of a computing application operable on a distributed system.

For example, assume that Function A is called "n" times. Accordingly, stack frame 502 may be associated with a list of "n" call structures (illustrated as call structure 552, 554, 556, 558). Call structure 552 may include previously-called function pointer 518, basic block set descriptor pointer 520, and parameters structure pointer 522. Call structure 554 may include previously-called function pointer 560, basic block set descriptor pointer 562, and parameters structure pointer 564. Call structure 556 may include previously-called function pointer 566, basic block set descriptor pointer 568, and parameters structure pointer 570. Call structure 558 may include previously-called function pointer 572, basic block set descriptor pointer 574, and parameters structure pointer 576. Additionally, stack frame 502 may include stack frame structure 578 (which may include descendant pointer 514 and sibling pointer 516). Thus the accumulation of call structures may be minimized to those structures necessary to represent a function call sequence in time as well as from each function to its immediate descendants. Recording of line-level (basic block) sequences can be added to this framework and may be limited to just those functions or modules of interest to the software developer using the profiler.

A set of data structures representing a basic block execution order may be established for a given call to a function. For further calls to the function, in which the basic blocks are executed in an order identical to the order represented by a set of these data structures previously recorded for the function, a count related to that set of data structures can be incremented, without the recording of a further set of those data structures. A representation of basic block execution history, thus coalesced for differential comparison purposes in a profiler that targets a distributed system, is more scalable than the execution recording made possible by a conventional omniscient debugger. Yet further scalability considerations are part of the inventive arrangements described below.

As discussed above, differential comparison process 410 (illustrated in FIG. 4) may allow a software developer to execute the same instance (e.g., instance 414 of FIG. 4) of a computing application running on multiple processors or nodes to determine why the computing application demonstrates, e.g., inconsistent performance behavior. For example, the instance of a computing application executed on a first node may perform differently from the same instance of the same computing application executed on a second node of a distributed system. Further, the instance of a computing application executed on a first computer platform may perform differently from the same instance (all or in part) of the same computing application executed on a second computer platform. Additionally, a computing application may simply perform or behave differently each time that computing application is executed on different platforms or nodes.

In one aspect, for a given computing instance of a distributed computer application, line-level and function-level profiling data may be collected for each node (e.g., node 1 and node 2 of FIG. 4) while simultaneously identifying inter-node relationships. Data rollups may be provided at a selected node either regularly or at the termination of an instance. In the data rollups, profiling data that is relevant to the inter-node relationships may be kept, stored, or maintained. However, for scalability, any redundant data that is not relevant to those inter-node relationships may be discarded. The relationships can include dependency, concurrency, resource sharing, or user-defined relationships.

In one aspect, the comparison process of the collected line-level and function-level profiling data from each node involves: 1) collecting information about each function, including zero or more of its siblings and top-level descendants, in a stack frame data structure (one per function per node); 2) collecting information about the parameters passed to each function, and the order in which the basic blocks of each function execute, in a set of call data structures (many per function per node); 3) comparing the call data structures for at least some stack frames that are similar; 4) comparing the stack frame data structures for at least some stack frames that are not similar; and 5) providing a result of the comparison.

The comparison operation allows the user to identify execution differences between identical or related functions, or across nodes that result in node-to-node performance or resource usage differences. However, comparing all of the stack frames and calls may not be feasible, because (a) different nodes may run at least some different functions, and (b) there are too many functions running too many times on too many nodes to feasibly compare everything that runs against everything else that runs. For that reason, only "selected" (or areas of interest) stack frames, and calls related to the selected stack frames, are compared.

In one aspect, various embodiments are provided to identify selected stack frames (or stack frames of interest). The selected stack frames may be identified based on relationships, either detected or indicated by an operator, between the processes or functions. For example, when a function on one node is invoked directly because of an operation of another function on another node, a stack frame comparison operation may be performed (both for those functions and, potentially, for the descendants of those functions). When multiple instances of the identical function are invoked, a call comparison may be performed between the relationship instances (and, potentially, the descendants of those instances). The same is true of functions (either different or identical instances, and, potentially, the descendants of those functions) that are automatically selected (e.g. because they access shared memory). The same is also true of functions that are tagged by the user as being in a relationship of interest to the user.

When a program is instrumented for use with the profiler, a detection of calls that invoke new processes or that trigger processing on a separate node can be arranged via interception of a relevant application programming interface ("API") function (e.g. CreateProcess( ) on Microsoft® Windows®). The same can be done for routines that access shared memory, routines that pass messages between nodes, or other routines that may be automatically selected for reasons relevant to the computing paradigm of the program under test. In embodiments where shared memory forms the basis for the automatic selection, the API functions that create or gain access to shared memory can be intercepted, the shared memory regions can be tracked per process, and accesses to those regions can be associated with the respective accessor functions and respective stack frames and calls recorded by the profiler, e.g. based on the data structures of FIGS. 4 and 5.

In one aspect, at runtime, a routine on one node may be invoked merely because a routine on another node has written to an agreed location in shared memory. This type of dependency relationship can be hard to automatically detect, but can be identified based on an indication from an operator. The indication can take the form of source code comments or other annotations supplied by the operator, possibly in the call graph itself. In one aspect, an instrumentation component can inspect source code for relevant source code annotations and associate the source code annotation with relevant debug data so that the relevant stack frames can be identified at runtime. In an additional aspect, call graph entries (i.e., an associated stack frame) may be matched from instance to instance and/or stored for use during the instrumentation phase for a subsequent run, or via runtime patching to perform dynamic call interception, or by any other means known to those of skill in the art.

Figure 7:
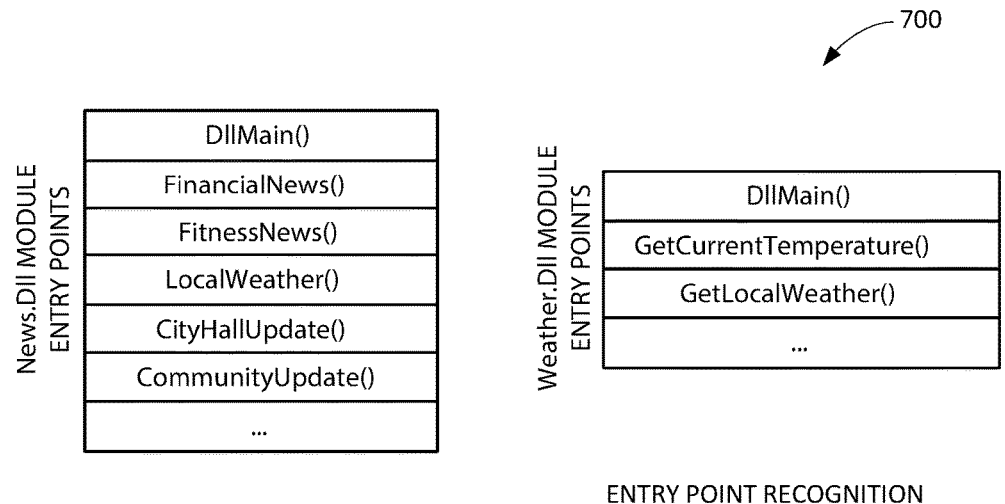
FIG. 7 is a diagram depicting an exemplary view of a set of call graphs using module entry point recognition for differential comparison in which aspects of the present invention may be realized.
Figure 8:
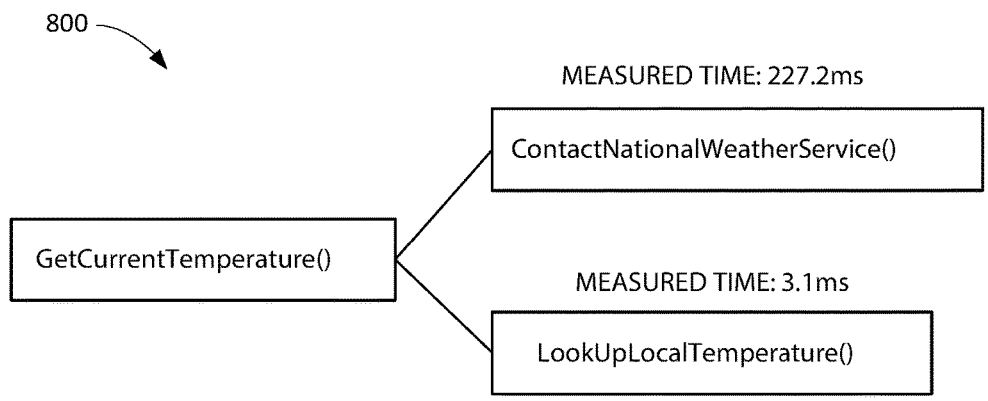
FIG. 8 is a diagram depicting an additional exemplary view of using a depth-first search from module entry points to find matching routines according to symbolic names in which aspects of the present invention may be realized.

Turning now to FIG. 7, a diagram 700 depicts an entry point recognition means for identifying functions of interest in call graphs, for differential comparison. FIG. 7 depicts a module named "News.Dll" and a module named "Weather.Dll", each having multiple entry points. A matching operation for stack frames is provided for automated comparison of call graphs and for processes that comprise a single run on multiple nodes. Finding a matching entry in two call graphs can include identifying a function of interest in the first call graph and then performing a depth-first search through the second call graph, as illustrated in FIG. 8, which depicts a depth-first search, from each entry point, and locating matching routines by symbolic names. A match may be found when a function is found that has the same name and namespace (e.g., a GetLocalWeather( ) function in the module named "Weather.Dll" in a graph). For faster matching, an index of function names can be built up, during or at the end of the run. The index can be ordered by function name and can serve a purpose similar to that of a search engine for finding the code associated with a function of a given name.

In an additional aspect, using the matching functionality operations, portions of a call graph may be compared based on which function has called which other function. This can be used to automatically identify interesting functions (e.g., particular functions of concern, selected functions, or other user-defined functions) to call out for performance comparison for review by the operator. For example, if the function "GetLocalWeather( )" runs much longer on one node than another, and if it is associated with differing descendants or differing basic block execution order on the two nodes, this may be a particular or identified aspect to bring to the operator's attention (e.g., by highlighting or shading a view of the call graph in question or bringing it close to the top of a "stack" of call graphs for display representing the various nodes).

The call data structure can include a reference to a caller function, a reference to a set of basic blocks executed in the function, and a set of parameters each of which can be stored for each call. That is, a reference to a set of call data structures can be stored in the stack frame data structure representing a function that has executed during the run (e.g., the instance of the computing program). Matching functions that exhibit variable performance depending on which of the descendants of the functions are invoked can include matching on different caller functions that call the same descendants, or matching on different descendants that have the same callers.

The matching functionality can be used to identify functions that are interesting (e.g., particular functions of concern, selected functions, or other user-defined functions) in various distributed computing scenarios. One or more functions of interest may be selected (e.g. by a user) by identifying them in a displayed call graph or set of call graphs, or in some cases merely by entering their names or selecting them from a list of functions for which special attention can be given. For instance, in cognitive computing scenarios, a specific factor of interest may be the actual use of the computed result. In a single cognitive computing scenario, a number of machine learning algorithms and/or heuristic algorithms each may be invoked, in parallel, to each arrive at a result that is associated with a score. The score may reflect a degree of relevance, or confidence, as to the applicability of the result of the individual algorithm in the cognitive computing scenario. The highest-scoring result, among these parallel computations, may prevail as the outcome of the cognitive computing scenario. Thus the results of the other computations may not be used, in that scenario. In some embodiments of the present invention, whether a computation contributes usefully to an outcome, such as the outcome of a cognitive computing scenario, is a data point that can be stored in a bit vector or other structure referenced by the stack frame. That is, a data point, associated with profiling results for the computing application, may be stored in a bit vector or data structure referenced by the stack frame (for a matching operation). For example, top-level functions that implement the various machine learning and/or heuristic algorithms of a cognitive computing system may be identified by the user, or automatically, as functions of interest. Functions whose results are consistently discarded, among many outcomes observed over time, may require attention from the operator of the profiler, for example a cognitive system developer using the profiler to evaluate the efficacy of the system's top-level machine learning functions in light of their performance. The profiler thus may be used for analyzing the performance of a cognitive computing system based on identifying these functions of interest.

In some cases, the matching operation can be performed autonomously. In one aspect, concurrent operations, dependent operations, or accesses to shared memory can be identified. The names of functions that perform the concurrent operations, dependent operations, or accesses to shared memory can be stored for reference when the call graph data from the various nodes is rolled up in preparation for display. Names or other identifiers of shared resources or synchronization objects also can be stored in association with the function names. If, for example, several nodes access a shared resource, then a list of the accessor functions across the various nodes can be compiled. In other aspects, these accessor functions can be highlighted in a certain shade when the call graphs are displayed (see also FIG. 9). In some embodiments, a link between call graphs representing two of the relevant nodes can be displayed such as, for example, via an interactive graphical user interface ("GUI") of a computing device (e.g., computer, laptop, tablet, smart phone, and the like).

The call graphs (e.g., color-highlighted or shaded call graphs) that may be displayed allow for usage of the shared resource to be profiled so that the operator can see which nodes have used the shared resource with relative efficiency or inefficiency. If one node spends a large percentage of time waiting on the shared resource while another one accesses the same resource readily and frequently, the time waiting on the shared resource can be autonomously highlighted as a performance consideration.

In some embodiments, a set of displayed call graphs may include links between the graphs, shown in a designated color or style, to indicate these results. This enables an operator to quickly see the differences in how the relevant functions have executed on the various nodes, and enables a user to drill down between and through the respective displayed call graphs to analyze the differences in further depth.

Figure 9:
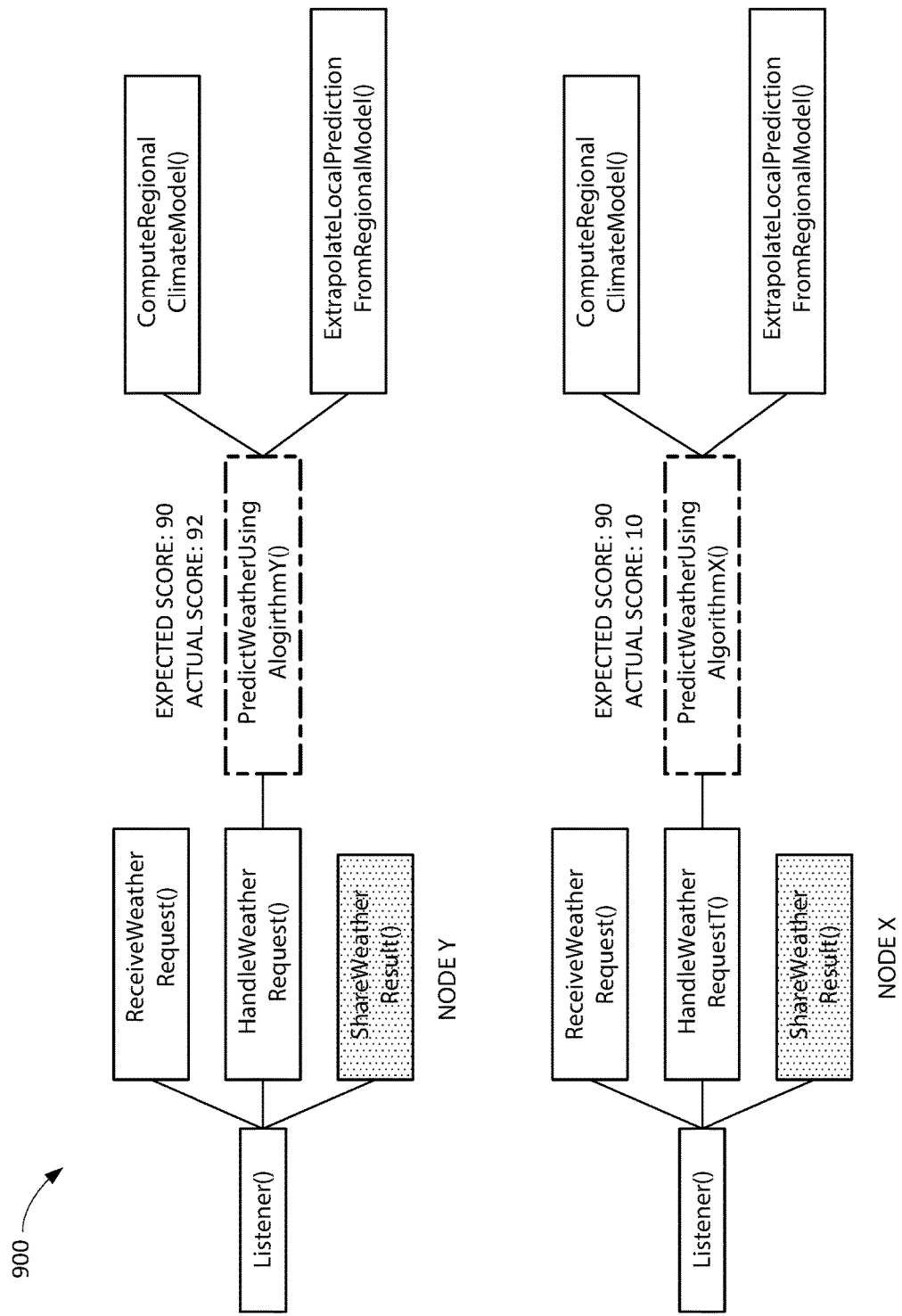
FIG. 9 is a diagram depicting an exemplary view of a set of call graphs in which aspects of the present invention may be realized.

Turning now to FIG. 9, diagram 900 depicting an exemplary view of call graphs is provided. In one aspect, the call graphs may represent, for a given instance of a computing program, an execution profile of a parallelized cognitive or deep learning application. Line-level and function-level profiling data may be collected for each parallelized deep learning operation while simultaneously (a) identifying which parallelized deep learning operations provide results to be scored, and (b) identifying relationships between the parallelized deep learning operations. For each scoring event, the scores may be assigned (e.g., an expected score and an actual score such as, for example, "90" out of 100 as an expected score and "92" out of 100 for an actual score) and tracked per parallelized deep learning operation. At the end of an instance of the computing application or at the end of a series of instances, the overall scoring results may be displayed in association with one or more displayed call graphs. The call graphs can be annotated with the overall scoring results along with overall resource usage (central processing unit ("CPU"), memory, other resources, or a combination thereof at one time). The call graphs may be annotated to show the relationships between the parallelized deep learning operations and expected (e.g., expected score), as opposed to actual (e.g., actual score), outcomes. The call graphs also may show execution orders, for example via a context menu that can be brought up for a displayed function, along with descendant functions that can appear on the displayed graph. The relationships also can include dependency, concurrency, resource sharing, or user-defined relationships. The functions can be highlighted in a certain color/shade when the call graphs are displayed (e.g., "PredictWeatherUsingAlgorithmY( )" and "ShareWeatherResult( )" or "PredictWeatherUsingAlgorithmX( )" and "ShareWeatherResult( )"). That is, in a set of call graphs representing operation of an instance on multiple nodes, color/shade coding or other graphical aspects may indicate relationships between graph elements involving inter-node relationships.

Further, a set of call graphs for a cognitive computing application can be organized such that relatively long-running machine learning algorithms or heuristics whose results are not effectively used in cognitive computing outcomes, such as a computationally intensive deep learning operation that rarely achieves a high score, are brought to the foreground. This may be done via highlighting graph interconnections leading to the ineffective algorithm(s), or by displaying a graph relevant to a node on which the ineffective algorithm(s) have run at or near the top of a "stack" of call graphs for the overall run (e.g. by displaying the graphs side by side according to a Z-ordering by time and/or computational utility), or both.

The operator can identify one or more functions related to machine learning or heuristics that participate in the cognitive computing process by returning scores. For each identified function that returns a score, the baseline, anticipated score, or a combination thereof may be provided, e.g. in a list. In one aspect, such a list may include (per function): 1) an anticipated execution order (e.g., in order of basic blocks in the function); 2) expected descendant functions; 3) relationships involving other functions; and 4) ranges of cumulative score utility (e.g., frequently or effectively useful, normal, low, and useless). The selections for being included in the list may be determined in advance of an instance, using a call graph collected via a previous instance or via static analysis, or using a list of functions involved in scoring.

In one aspect, the cognitive computing process may compare one or more functions, which may provide scored results. The comparison of functions whose results are scored can include: 1) collecting information about each function, including its siblings and top-level descendants, in a stack frame data structure (one per function per node); 2) collecting information about the parameters passed to each function, and the order in which the basic blocks of each function execute, in a set of call data structures (many per function per node); 3) comparing the call data structures for at least some stack frames representing functions whose results are scored similarly; and 4) providing a result of the comparison.

The comparison operation may include identifying execution differences for those functions whose results are scored alike. Performance or resource usage differences, among one or more functions, can be compared. The utility of a computation is a data point that can be stored in a vector (e.g., a bit vector) or other structure referenced by the stack frame. Comparing score utility and function plus descendant time summations can include comparing the bit vectors and the accumulated time for functions referenced by the stack frame.

In an additional aspect, the functions to be compared may include functions that have relationships with one another, either detected or indicated by a profiler operation or user. When a function whose result is scored is invoked directly because of an operation of another function, the relationship allows for stack frame comparison (for both those functions and, potentially, sibling functions whose results are also scored). When multiple instances of the identical function are invoked, a call comparison may be performed for instances having a relationship (and descendants of those instances), or for functions (either different or identical instances, and potentially descendants of the functions) that access shared memory, or for functions that are tagged, which may be by the user, as being in a relationship of interest to the user.

The output is one or more call graphs where expensive, poorly scoring deep learning algorithms and any of their descendant functions can be automatically indicated to be of interest more so than their relatively cheaply-running and high-scoring cousins. The invention also enables groups of these cousins to be readily or automatically brought up in linked call graphs (e.g., with the relevant portions displayable side-by-side and interlinked) for comparison.

The results of functions that return scores and thereby contribute to a cognitive computing outcome can be correlated, for example across all functions that return such scores, and displayed, for example in a series of call graphs ordered by utility, by function plus descendant time, by function plus descendant resource usage, or by any other ordering. Alternatively, the functions can be displayed in a pie chart, a function list, or any other view that may be ordered similarly. Performance or scalability differences associated with differing descendant functions can also be highlighted or shaded, as in FIG. 9. Also, differences associated with varying execution orders of the basic blocks within similar or identical functions whose results are scored may also be highlighted or shaded.

Similar or identical functions can be matched to one another as described herein so as to reveal performance or scalability considerations that may have been resolved in some deep learning contexts but not resolved in other deep learning contexts.

In one aspect, an annotated source code view may be provided with one or more differences arranged to be displayed, for example by clicking on a function in the call graph. Differences between calls having similar or identical descendants can be indicated in the annotated source view. Results for an instance can be saved to a file. A machine learning algorithm or heuristic used by the computer program under test can be adjusted, and the program re-executed, to create a new instance for comparison with a previous instance at either the call graph or annotated source level. In this way, one or more changes may be performed and quantitatively testable in terms of scoring outcomes, performance, and scalability, or possibly all three of these at once.

As disclosed herein above, to allow advantageous navigation of profiling results generated via embodiments of the present invention, for a single instance of a distributed application, a set of call graphs may be generated. The set of call graphs may be generated for each node or parallelized process that is involved in a profiled run of a distributed application. A display can include each call graph side-by-side or in a three dimensional ("3D") arrangement depicting interesting, selected, or defined relationships between call graph elements. The relationships can include dependency, concurrency, resource sharing, user-defined, or other relationships between elements in the various displayed graphs. The relationships also can include common participation in a cognitive computing process by the returning of scored results, as described hereinabove. A scrollable or tabbed view can provide access to all of the displayed call graphs for the run. A view that allows an operator to follow paths between related elements also can provide access among graphs of interest.

Figure 10:
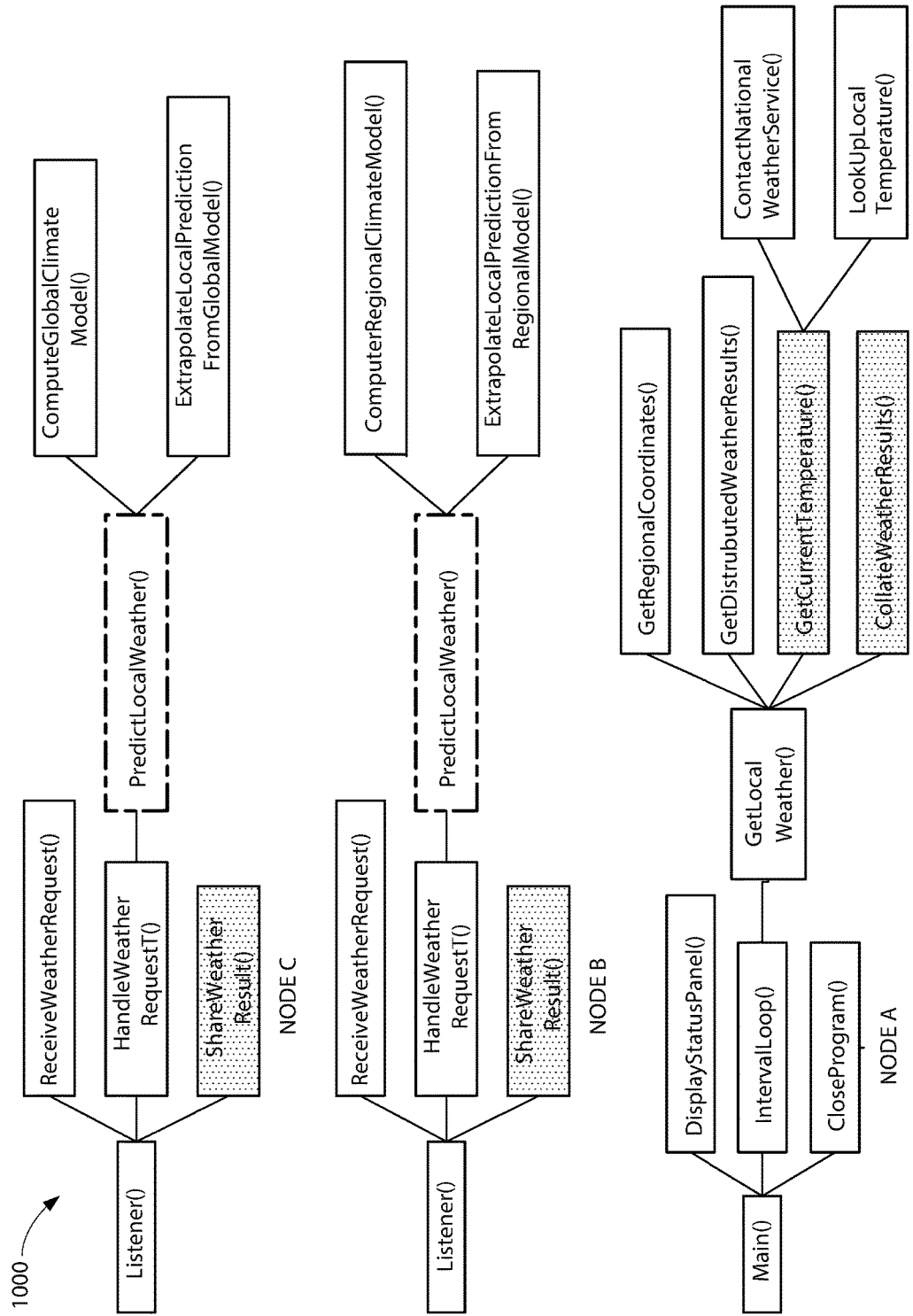
FIG. 10 is a diagram depicting an additional exemplary view of a set of call graphs in which aspects of the present invention may be realized.

Turning now to FIG. 10, a set of call graphs is depicted, representing a run. Color/shade coding, or other graphical aspects, may indicate relationships between graph elements involving inter-node relationships. The relationships can include (among others): dependency (e.g., an element on the one graph is invoked in response to another element on the other graph); concurrency (e.g., elements on two graphs run in an interlocked manner); resource sharing (e.g., elements on two graphs access resources shared by the respective nodes); common participation in a cognitive computing process; or user-defined relationships (e.g., the operator has defined interesting or related elements via call graph or source code annotations).

The set of call graphs can include top-level functions in terms of time spent per function, resource usage per function, and the like. In one aspect, a selected function can be expanded to extend the view and show the descendants of the function. In an additional aspect, a view of a function's source code may be opened. The source code shown in the view may be annotated to indicate time or resource usage.

As depicted in FIG. 10, Node A executes a GetLocalWeather( ) function that invokes listener routines on Nodes B and C. By way of example only, an operator has defined PredictLocalWeather( ) as a function of interest that is invoked by the listener routines. Though the function operates differently from node to node in this example, the time or resources used may be compared for each node, for example based on automatic highlighting/shading that indicates this function to be of user-defined interest. Nodes B and C may each share the respective results from their (e.g., Nodes B and C) PredictLocalWeather( ) runs with Node A via the ShareWeatherResult( ) routines automatically highlighted in another shade that indicates these routines to be related, since they perform inter-node communication, e.g. by accessing shared memory. A context menu item can provide the operator with information as to which node accessed shared memory at which time, according to a coordinated clock.

Figure 11:
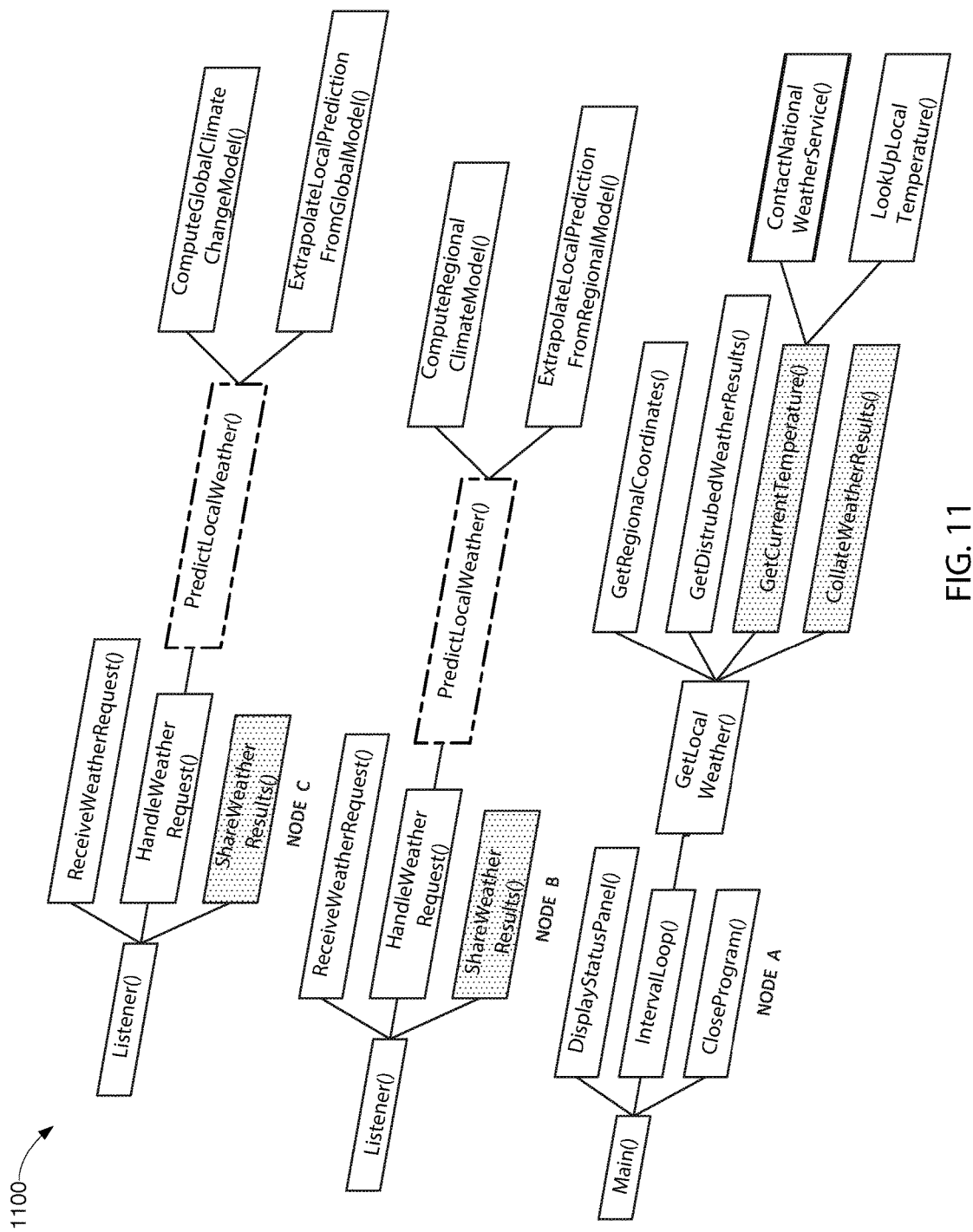
FIG. 11 is a diagram depicting an additional exemplary view of a set of call graphs in which aspects of the present invention may be realized.

In one aspect, a view of the set of call graphs for a run can be displayed in a 3D arrangement for selection of one graph or another graph by the operator for deeper analysis, as illustrated in FIG. 11. FIG. 11 depicts an exemplary set of call graphs that can be displayed in a 3D arrangement. The view of the set of graphs may be rotated one way or another (e.g., left, right, up, down, forward, backwards, etc.), so that either more or less graphs can fit into a display view (e.g., an interactive GUI) as the graphs are turned more "sideways", or so that information on the graphs is more readable as the graphs are "straightened back out". A GUI control for adjusting a view of multiple related call graphs in this manner can be based, for example, on a circular icon with an area that can be dragged via a circular mouse motion, or text, voice, or other control of the view may be made available, in order to control a number and aspect of call graphs displayed in a 3D rendering.

It should be noted that any of the selected or displayed views and multiple graphs may be displayed per physical node. For example, if multiple virtual machines are running on a node, or if multiple threads within a selected virtual machine are responsible for separate computations, one or more graphs may be included in a displayed set of call graphs. For example, a call graph may be generated per thread, or per virtual machine. A name may be assigned to one or more of the graphs based on a top-level function name, a node name, or according to user-defined naming arranged via call graph or source code annotations.

In one aspect, the graphs may be displayed in an order according to expected interests or selected portions. A top-level or "most interesting" graph (e.g., a selected, defined, and/or an area of interest, e.g. according to the longest time spent or most memory used by a top-level function) may be displayed first or most prominently according to policy or preference, for example in the top of a 3D arrangement of graphs that are "stacked" in a Z-ordering based on criteria of interest. For example, graph 1100 may be a graph for the first node to start, among the set of profiled nodes. Graph 1100 also may be a graph for a node that has used the most resources (e.g., used greater than 50% use of all combined resources), the node that has finished processing last, the node that has spent the most time or resources compared to a baseline or other expectation set by the operator or automatically, or a combination thereof. Automatic arrangements can include an expectation that may be defined or set (e.g., setting an expectation in a cognitive computing system according to a utility of a computation, such as how frequently the portion of the distributed application represented by the graph contributes to the output or result of the overall distributed process). This automatic aspect may be particularly relevant for analyzing cognitive computing systems and deep learning programs under test.

In one aspect, a first data set may be received corresponding to code that has executed on a first processor. A second data set may be received corresponding to code that has executed on a second processor. A first call graph, representing at least a portion of the first data set, may be displayed simultaneously with a second call graph representing at least a portion of the second data set, and simultaneously with one or more representations of one or more relationships between one or more elements of the first call graph and one or more elements of the second call graph.

Figure 12:
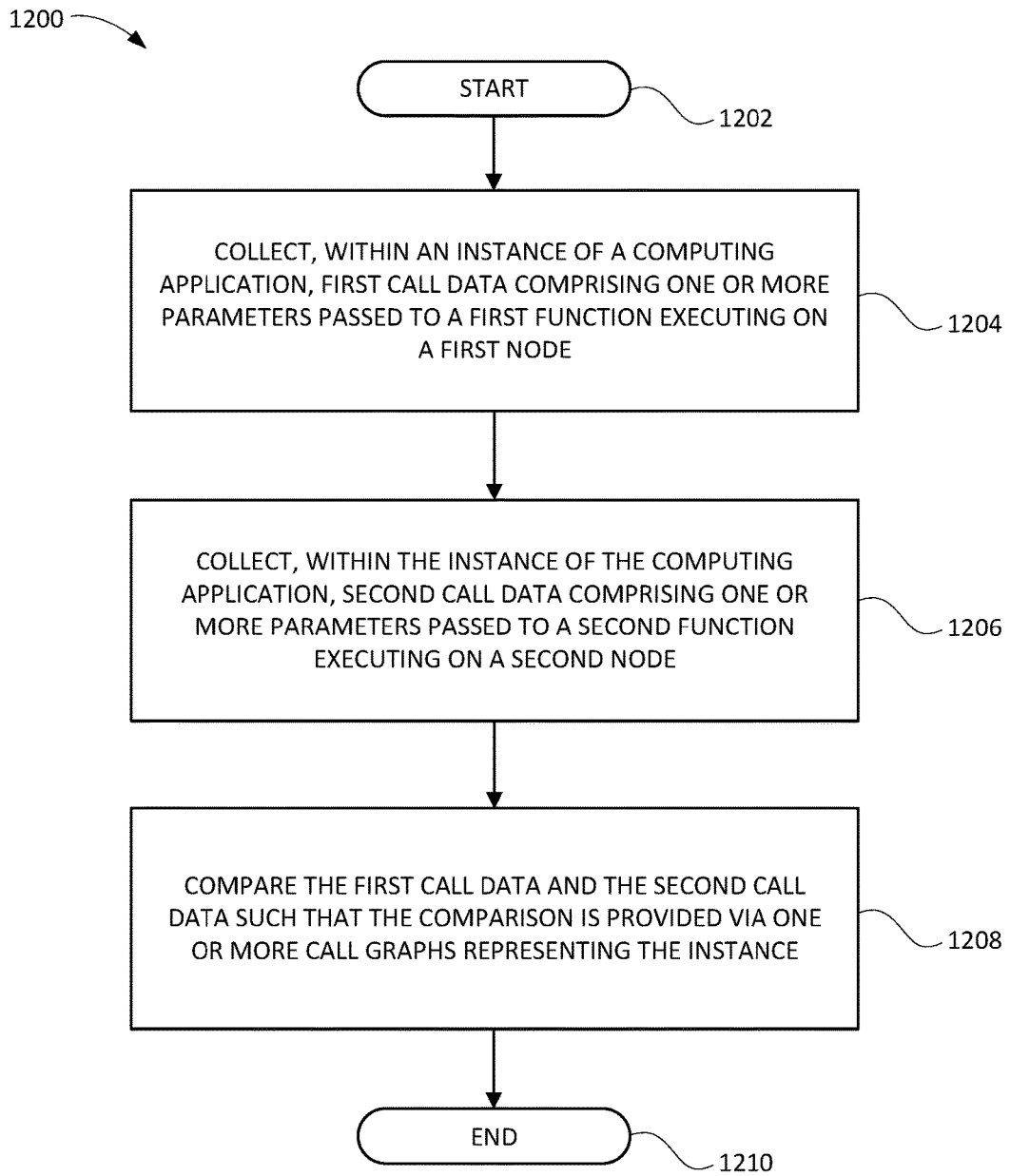
FIG. 12 is a flowchart diagram depicting an exemplary method for differential comparison by a processor in which aspects of the present invention may be realized.

Turning now to FIG. 12, an additional method 1200 for profiling an instance of a computing program distributed across a plurality of nodes in a distributed computing environment is depicted, in which various aspects of the illustrated embodiments may be implemented. The functionality 1200 may be implemented as a method executed as instructions on a machine, where the instructions are included on at least one computer readable medium or one non-transitory machine-readable storage medium. The functionality 1200 may start, as in block 1202. First call data, comprising one or more parameters passed to a first function executing on a first node, may be collected within an instance of a computing application, as in block 1204. Second call data, comprising one or more parameters passed to a second function executing on a second node, may be collected within the instance of a computing application, as in block 1206. The first call data and the second call data may be compared such that the comparison is provided via one or more call graphs representing the instance, as in block 1208. The functionality 1200 may end in block 1210.

In one aspect, in conjunction with and/or as part of at least one block of FIG. 12, the operations of method 1200 may include each of the following. The operations of method 1200 may provide the comparison of the first call data and the second call data via one or more call graphs representing the instance, the first function, the second function, one or more relationship types, or a combination thereof, wherein the one or more relationship types include a dependency relationship, a concurrency relationship, a resource sharing relationship, a user defined relationship, or a combination thereof. The operations of method 1200 may identify one or more relationships between the first function and the second function and may identify a dependency relationship, a concurrency relationship, a resource sharing relationship, a user defined relationship, or a combination thereof between the first function and the second function. The first function and the second function may be identical.

In an additional aspect, the operations of method 1200 may collect first call data for a first function comprising one or more of passed-in parameters, basic block execution order, and a score associated with execution of the first function. The operations of method 1200 also may collect second call data for a second function comprising one or more of passed-in parameters, basic block execution order, and a score associated with execution of the second function. The operations of method 1200 also may compare the first call data with a first baseline and the second call data with a second baseline, and provide comparison results via one or more indications on one or more displayed call graphs.

The operations of method 1200 may compare the first call data with a first baseline and the second call data with a second baseline, wherein the first baseline and the second baseline are received from a set of baseline data for a set of functions, wherein the first baseline and the second baseline may comprise the one or more parameters, an execution order of a basic block, a score associated with execution of the first function executing on the first node, a score associated with execution of the second function executing on the second node, a performance criterion, a resource usage criterion, other criteria, or any combination thereof. One or more call graphs may be displayed, each representing profiling results for an instance of a process participating in the computing application distributed on the first node and the second node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for profiling, by one or more processors, an instance of a computing program distributed across a plurality of nodes in a distributed computing environment, comprising:
   collecting, within an instance of a computing application, first call data comprising one or more first parameters passed to a first function executing on a first node comprising a first computer;
   collecting, within the instance of the computing application, second call data comprising one or more second parameters passed to a second function executing on a second node comprising a second computer;
   comparing the first call data and the second call data such that the comparison is provided via one or more call graphs representing the instance;
   comparing the first call data with a first baseline and the second call data with a second baseline, wherein the first baseline and the second baseline are received from a set of baseline data for a set of functions or from an annotated call graph, wherein the first baseline and the second baseline comprise an execution order of a basic block, a score associated with execution of the first function executing on the first node, a score associated with execution of the second function executing on the second node, the one or more first parameters, and the one or more second parameters generating profiling results for the instance of the computing application according to the comparison of the first call data with the first baseline and the second call data with the second baseline; and displaying, in the one or more call graphs representing the instance, the profiling results for the computing application distributed on the first node and the second node; wherein the profiling results are used by a user to adjust programming data within the instance of the computing application for debugging operations.

2. The method of claim 1, further including providing the comparison of the first call data and the second call data via one or more call graphs representing the instance, the first function, the second function, one or more relationship types, or a combination thereof, wherein the one or more relationship types include one or more of a dependency relationship, a concurrency relationship, a resource sharing relationship, a user defined relationship, or a combination thereof.

3. The method of claim 1, further including identifying one or more relationships between the first function and the second function.

4. The method of claim 1, further including identifying a dependency relationship, a concurrency relationship, a resource sharing relationship, a user defined relationship, or a combination thereof between the first function and the second function.

5. The method of claim 1, further including determining that the first function and the second function are identical.

6. The method of claim 1, further including:
building an index of function names for the comparing; or
storing a data point associated with the profiling results for the computing application in a bit vector or data structure referenced by the stack frame.

7. A system for profiling an instance of a computing program distributed across a plurality of nodes in a distributed computing environment, comprising:
one or more computers with executable instructions that when executed cause the system to:
collect, within an instance of a computing application, first call data comprising one or more first parameters passed to a first function executing on a first node comprising a first computer;
collect, within the instance of the computing application, second call data comprising one or more second parameters passed to a second function executing on a second node comprising a second computer;
compare the first call data and the second call data such that the comparison is provided via one or more call graphs representing the instance;
compare the first call data with a first baseline and the second call data with a second baseline, wherein the first baseline and the second baseline are received from a set of baseline data for a set of functions or from an annotated call graph, wherein the first baseline and the second baseline comprise an execution order of a basic block, a score associated with execution of the first function executing on the first node, a score associated with execution of the second function executing on the second node, the one or more first parameters, and the one or more second parameters;
generate profiling results for the instance of the computing application according to the comparison of the first call data with the first baseline and the second call data with the second baseline; and display, in the one or more call graphs representing the instance, the profiling results for the computing application distributed on the first node and the second node; wherein the profiling results are used by a user to adjust programming data within the instance of the computing application for debugging operations.

8. The system of claim 7, wherein the executable instructions provide the comparison of the first call data and the second call data via one or more call graphs representing the instance, the first function, the second function, one or more relationship types, or a combination thereof, wherein the one or more relationship types include one or more of a dependency relationship, a concurrency relationship, a resource sharing relationship, a user defined relationship, or a combination thereof.

9. The system of claim 7, wherein the executable instructions identify one or more relationships between the first function and the second function.

10. The system of claim 7, wherein the executable instructions identify a dependency relationship, a concurrency relationship, a resource sharing relationship, a user defined relationship, or a combination thereof between the first function and the second function.

11. The system of claim 7, wherein the executable instructions determine that the first function and the second function are identical.

12. The system of claim 7, wherein the executable instructions:
build an index of function names for the comparing; or
store a data point associated with the profiling results for the computing application in a bit vector or data structure referenced by the stack frame.

13. A computer program product for profiling, by a processor, an instance of a computing program distributed across a plurality of nodes in a distributed computing environment, the computer program product comprising a non-transitory computer-readable storage medium having computer-readable program code portions stored therein, the computer-readable program code portions comprising:
an executable portion that collects, within an instance of a computing application, first call data comprising one or more first parameters passed to a first function executing on a first node comprising a first computer;
an executable portion that collects, within the instance of the computing application, second call data comprising one or more second parameters passed to a second function executing on a second node comprising a second computer;
an executable portion that compares the first call data and the second call data such that the comparison is provided via one or more call graphs representing the instance;
an executable portion that compares the first call data with a first baseline and the second call data with a second baseline, wherein the first baseline and the second baseline are received from a set of baseline data for a set of functions or from an annotated call graph, wherein the first baseline and the second baseline comprise an execution order of a basic block, a score associated with execution of the first function executing on the first node, a score associated with execution of the second function executing on the second node, the one or more first parameters, and the one or more second parameters;
an executable portion that generates profiling results for the instance of the computing application according to the comparison of the first call data with the first baseline and the second call data with the second baseline; and an executable portion that displays, in the one or more call graphs representing the instance, the profiling results for the computing application distributed on the first node and the second node; wherein the profiling results are used by a user to adjust programming data within the instance of the computing application for debugging operations.

14. The computer program product of claim 13, further including an executable portion that provides the comparison of the first call data and the second call data via one or more call graphs representing the instance, the first function, the second function, one or more relationship types, or a combination thereof, wherein the one or more relationship types include one or more of a dependency relationship, a concurrency relationship, a resource sharing relationship, a user defined relationship, or a combination thereof.

15. The computer program product of claim 13, further including an executable portion that:
identifies one or more relationships between the first function and the second function; or
identifies a dependency relationship, a concurrency relationship, a resource sharing relationship, a user defined relationship, or a combination thereof between the first function and the second function.

16. The computer program product of claim 13, further including an executable portion that determines that the first function and the second function are identical.

17. The computer program product of claim 13, further including an executable portion that:
builds an index of function names for the comparing; or
stores a data point associated with the profiling results for the computing application in a bit vector or data structure referenced by the stack frame.

* * * * *